(12) United States Patent
Paukner et al.

(10) Patent No.: US 11,053,827 B2
(45) Date of Patent: Jul. 6, 2021

(54) EXHAUST AFTERTREATMENT SYSTEM AND METHOD FOR REGENERATING A PARTICULATE FILTER

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE); Michael Manz, Langenhagen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/446,248

(22) Filed: Jun. 19, 2019

(65) Prior Publication Data
US 2019/0383188 A1    Dec. 19, 2019

(30) Foreign Application Priority Data

Jun. 19, 2018    (DE) ............ 10 2018 114 681.7

(51) Int. Cl.
*F01N 3/20* (2006.01)
*F01N 3/035* (2006.01)
*F01N 3/10* (2006.01)

(52) U.S. Cl.
CPC .......... *F01N 3/2013* (2013.01); *F01N 3/035* (2013.01); *F01N 3/101* (2013.01)

(58) Field of Classification Search
CPC ...... F01N 13/008; F01N 13/009; F01N 3/023; F01N 3/027; F01N 3/035; F01N 3/101;
(Continued)

(56) References Cited

U.S. PATENT DOCUMENTS

| | | | | | |
|---|---|---|---|---|---|
| 5,916,130 | A | * | 6/1999 | Nakae | ............ B60K 6/365 60/276 |
| 6,797,517 | B1 | * | 9/2004 | Hoshi | ............ F01N 3/0807 436/37 |

(Continued)

FOREIGN PATENT DOCUMENTS

| | | |
|---|---|---|
| CN | 1725005 A | 1/2006 |
| CN | 107084023 A | 8/2017 |

(Continued)

OTHER PUBLICATIONS

Machine Translation of DE-102015212514-A1 (Year: 2017).*
(Continued)

*Primary Examiner* — Brandon D Lee
(74) *Attorney, Agent, or Firm* — Pearl Cohen Zedek Latzer Baratz LLP (57) ABSTRACT

The invention relates to an exhaust aftertreatment system for an internal combustion engine that, at its outlet, is connected to an exhaust gas system. In the exhaust gas system, a three-way catalytic converter close to the engine, an electrically heatable three-way catalytic converter downstream from the three-way catalytic converter close to the engine, and further downstream, a particulate filter or a four-way catalytic converter are situated in the flow direction of an exhaust gas of the internal combustion engine through an exhaust duct of the exhaust gas system. In addition, the exhaust aftertreatment system includes a secondary air system with a secondary air pump and a secondary air line,
(Continued)

which opens into the exhaust duct at an introduction point downstream from the three-way catalytic converter close to the engine and upstream from the electrically heatable three-way catalytic converter. The invention further relates to a method for regenerating a particulate filter or the four-way catalytic converter by use of such an exhaust aftertreatment system.

13 Claims, 7 Drawing Sheets

(58) Field of Classification Search
CPC ........ F01N 3/2013; F01N 3/2026; F01N 3/30; F01N 9/002; F01N 2250/02; F01N 2550/14; Y02T 10/12; Y02T 10/40
See application file for complete search history.

(56) References Cited

U.S. PATENT DOCUMENTS

| | | | |
|---|---|---|---|
| 2001/0013222 A1* | 8/2001 | Mizoguchi | F01N 11/00 60/289 |
| 2007/0122319 A1* | 5/2007 | Dacosta | F01N 3/2821 422/180 |
| 2010/0011749 A1* | 1/2010 | Fujiwara | F01N 3/106 60/286 |
| 2010/0043430 A1* | 2/2010 | DeHart | F01N 3/05 60/605.1 |
| 2011/0072788 A1* | 3/2011 | Ruona | F01N 9/00 60/276 |

FOREIGN PATENT DOCUMENTS

| | | | | |
|---|---|---|---|---|
| DE | 10 2010 046 747 A1 | 3/2011 | | |
| DE | 10 2015 212 514 A1 | 1/2017 | | |
| DE | 102015212514 A1 * | 1/2017 | ............ | F02M 26/10 |
| DE | 10 2015 215 373 A1 | 2/2017 | | |
| DE | 10 2016 102 325 A1 | 8/2017 | | |
| DE | 10 2016 119 211 A1 | 4/2018 | | |
| DE | 10 2016 120 432 A1 | 4/2018 | | |
| DE | 10 2016 122 304 A1 | 5/2018 | | |
| WO | WO 2004/061278 A1 | 7/2004 | | |

OTHER PUBLICATIONS

Search report for German Patent Application No. 10 2018 114 681.7, dated Mar. 13, 2019.
Office Action for European Patent Application No. 19 179 865.1, dated Nov. 12, 2020.
Office Action for Chinese Patent Application No. 201910504890.2, dated Feb. 2, 2021.

* cited by examiner

```
┌─────────────────────────────────────────────────────────────────────┐
│ Operating the internal combustion engine with a stoichiometric      │
│ combustion air ratio $\lambda_E = 1$.                         901   │
└─────────────────────────────────────────────────────────────────────┘
                                   │
                                   ▼
┌─────────────────────────────────────────────────────────────────────┐
│ Activating the electrically heated three-way catalytic converter    │
│ when a regeneration of the particulate filter or of the four-way    │
│ catalytic converter is requested.                             903   │
└─────────────────────────────────────────────────────────────────────┘
                                   │
                                   ▼
┌─────────────────────────────────────────────────────────────────────┐
│ Heating the electrically heated three-way catalytic converter to    │
│ its light-off temperature ($T_{LO}$).                         905   │
└─────────────────────────────────────────────────────────────────────┘
                                   │
                                   ▼
┌─────────────────────────────────────────────────────────────────────┐
│ Adjusting the combustion air ratio of the internal combustion       │
│ engine from the stoichiometric combustion air ratio ($\lambda_E=1$) │
│ to an understoichiometric combustion air ratio ($\lambda_E < 1$);   │
│ while, at the same time, blowing secondary air into the exhaust     │
│ gas system downstream from the three-way catalytic converter        │
│ close to the engine.                                          907   │
└─────────────────────────────────────────────────────────────────────┘
                                   │
                                   ▼
┌─────────────────────────────────────────────────────────────────────┐
│ Resulting in an overstoichiometric exhaust gas-air ratio            │
│ ($\lambda_{EG} > 1$) at the inlet of the particulate filter or the  │
│ four-way catalytic converter.                                 909   │
└─────────────────────────────────────────────────────────────────────┘
```

FIG. 9

EXHAUST AFTERTREATMENT SYSTEM AND METHOD FOR REGENERATING A PARTICULATE FILTER

FIELD OF THE INVENTION

The invention relates to an exhaust aftertreatment system for an internal combustion engine, and a method for regenerating a particulate filter in the exhaust gas system of a gasoline engine.

BACKGROUND OF THE INVENTION

The increasing stringency of exhaust emission regulations has placed high demands on automotive manufacturers, which are addressed by suitable measures to reduce uncontrolled engine emissions and appropriate exhaust aftertreatment. The EU6 legislation prescribes a particle count limit for gasoline engines, which in many cases requires use of a gasoline engine particulate filter. Such soot particles arise in particular after a cold start of the internal combustion engine due to incomplete combustion, in combination with an overstoichiometric combustion air ratio after the cold start, cold cylinder walls, and the heterogeneous mixture distribution in the combustion chambers of the internal combustion engine. In contrast to the loading of a diesel particulate filter, the soot loading of a gasoline engine particulate filter takes place essentially as a function of the combustion chamber temperature, and decreases with increasing combustion chamber temperature. Thus, the cold start phase plays a crucial role in compliance with the regulatory particulate limits, with regard to the particle mass as well as the particle count. At cold outside temperatures, in particular at ambient temperatures below 0° C., particulate emissions are particularly high in a gasoline engine due to the low degree of mixture homogenization and evaporation of the fuel, as well as the starting enrichment. In addition, a cold start with an understoichiometric, rich combustion air ratio results in higher emissions of carbon monoxide (CO) and unburned hydrocarbons (HC), since conversion to carbon dioxide and water vapor is not yet possible due to the cold catalytic converter. During driving operation, for motor vehicles with a gasoline engine particulate filter, this gasoline engine particulate filter then becomes further loaded with soot. This gasoline engine particulate filter must be continuously or periodically regenerated to prevent excessive exhaust back pressure. The increase in exhaust back pressure may result in increased fuel consumption by the internal combustion engine, power loss, and impaired running smoothness, even misfiring. Carrying out thermal oxidation of the soot, retained in the gasoline engine particulate filter, with oxygen requires a sufficiently high temperature level together with the simultaneous presence of oxygen in the exhaust gas system of the gasoline engine. Since current gasoline engines are normally operated with a stoichiometric combustion air ratio ($\lambda=1$) without excess oxygen, additional measures are necessary. Examples of such measures include increasing the temperature by adjusting the ignition angle, temporarily adjusting the gasoline engine to lean conditions, blowing secondary air into the exhaust gas system, or a combination of these measures. Thus far, adjustment of the ignition angle in the retarded direction in combination with an adjustment of the gasoline engine to lean has been preferred, since this method does not require additional components, and is able to deliver a sufficient quantity of oxygen in most operating points of the gasoline engine.

As a result of the good efficiencies in the gasoline engine, regeneration of a particulate filter in the underbody position is impossible in certain operating situations, so that special driving cycles are necessary for regenerating a particulate filter in the underbody position.

DE 10 2010 046 747 A1 discloses an exhaust aftertreatment system for a gasoline engine and a method for exhaust aftertreatment. A particulate filter is situated downstream from a three-way catalytic converter; for regenerating the soot particles retained in the particulate filter a secondary air system may be provided which blows fresh air into the exhaust gas system, downstream from the three-way catalytic converter and upstream from the particulate filter. The secondary air is used to exothermically react unburned exhaust gas components, in particular unburned hydrocarbons, and to heat the exhaust gas stream and supply the oxygen necessary for regenerating the particulate filter.

An internal combustion engine having an exhaust gas system is known from DE 10 2015 215 373 A1, in which intake air is drawn in downstream from a compressor of an exhaust gas turbocharger and supplied to the exhaust duct downstream from the turbine of the exhaust gas turbocharger. In the exhaust gas system, a three-way catalytic converter is situated downstream from the introduction point for the secondary air, and a particulate filter is situated downstream from the three-way catalytic converter.

DE 10 2016 102 325 A1 discloses an exhaust aftertreatment system for an internal combustion engine, having a three-way catalytic converter close to the engine and a particulate filter situated downstream from the three-way catalytic converter, wherein secondary air may be introduced into the exhaust gas system directly upstream from the particulate filter to assist with the oxidation of the soot retained in the particulate filter.

However, a disadvantage with the known approaches is that regeneration of the particulate filter in the underbody position of a motor vehicle shortly after starting the engine is not possible, since the particulate filter does not reach the regeneration temperature necessary for oxidizing the retained soot.

SUMMARY OF THE INVENTION

The object of the invention is to allow the particulate filter to be regenerated in all operating situations of the internal combustion engine.

According to the invention, this object is achieved by an exhaust aftertreatment system for an internal combustion engine, in particular a spark-ignited internal combustion engine according to the Otto spark ignition principle, wherein the exhaust aftertreatment system includes a three-way catalytic converter close to the engine and a particulate filter or four-way catalytic converter situated downstream from the three-way catalytic converter close to the engine. According to the invention, it is provided that an electrically heatable three-way catalytic converter is situated downstream from the three-way catalytic converter close to the engine, and upstream from the particulate filter or the four-way catalytic converter, wherein an introduction point for introducing secondary air into an exhaust duct of the exhaust gas system is provided downstream from the three-way catalytic converter close to the engine, and upstream from the electrically heatable three-way catalytic converter. In this context, a position of the three-way catalytic converter close to the engine is understood to mean a position of the three-way catalytic converter in the exhaust gas system having an exhaust gas path length of less than 80 cm, preferably less than 50 cm, starting from an outlet of the internal combustion engine. The proposed exhaust aftertreatment system allows rapid, low-emission regeneration of the particulate filter or four-way catalytic converter, in particular a gasoline engine particulate filter in the underbody position of a motor vehicle, essentially independently of the load profile of the internal combustion engine or the driving profile of a motor vehicle with an internal combustion engine. The temperature necessary for regenerating the particulate filter or four-way catalytic converter is achieved with the aid of the electrically heatable three-way catalytic converter in combination with a rich adjustment of the engine and simultaneous blowing in of secondary air. Ideally, the introduction point for the secondary air is provided directly downstream from the three-way catalytic converter close to the engine, and thus preferably remote from the electrically heatable three-way catalytic converter, in order to achieve the best possible mixing of the exhaust gas with the fresh air from the secondary air system prior to entry into the electrically heatable three-way catalytic converter and the particulate filter or four-way catalytic converter.

Advantageous enhancements and refinements of the exhaust aftertreatment system stated in the independent claim are possible as a result of the features set forth in the dependent claims.

In one preferred embodiment of the invention, it is provided that the particulate filter has a design that is free of a catalytically active coating. As the result of a coating-free design of the particulate filter, the exhaust back pressure is decreased, so that the fuel consumption of the internal combustion engine may be reduced. At the same time, the regeneration intervals may be extended since, under the same operating conditions, there is a longer time until the exhaust back pressure across the particulate filter has increased to the point that regeneration of the particulate filter is necessary. In addition, in a coating-free particulate filter there is no influence on the conversion of the gaseous exhaust gas components, so that simple on-board diagnostics of the particulate filter may be carried out using differential pressure sensors.

In one advantageous embodiment of the exhaust aftertreatment system, it is provided that the electrically heatable three-way catalytic converter has a design that is free of an oxygen store. The electrically heatable three-way catalytic converter can thus exothermically convert unburned hydrocarbons and hydrogen, which arise at the first three-way catalytic converter during understoichiometric operation, into water vapor and carbon dioxide. To determine the oxygen content of the exhaust gas upon entry into the particulate filter or the four-way catalytic converter, the electrically heatable three-way catalytic converter has a design with a wash coat without oxygen store capability, so that there is no time delay of the lambda sensor signal at the lambda sensor downstream from the electrically heatable three-way catalytic converter and upstream from the particulate filter or the four-way catalytic converter.

In one advantageous enhancement of the invention, it is provided that a hydrogen catalytic converter is situated downstream from the introduction point for the secondary air and upstream from the electrically heatable three-way catalytic converter. The hydrogen catalytic converter assists with measuring the exhaust gas-air ratio with a lambda sensor after secondary air is introduced upstream from the electrically heatable three-way catalytic converter during the rich adjustment of the internal combustion engine, since otherwise, the hydrogen in the exhaust gas results in distortion of the measuring signal at the lambda sensor and thus, possible deviations in the measured exhaust gas-air ratio.

It is particularly preferred when a first lambda sensor, in particular a broadband sensor, is situated in the exhaust gas system upstream from the three-way catalytic converter close to the engine, and a second lambda sensor, in particular a second broadband sensor, is situated downstream from the hydrogen catalytic converter and upstream from the electrically heatable three-way catalytic converter. Alternatively, the second lambda sensor may be designed as a jump sensor. The combustion air ratio of the internal combustion engine and the exhaust gas-air ratio, with secondary air blowing activated, may be determined by use of the lambda sensors. An appropriate quantity of excess air for oxidizing the soot retained in the particulate filter may thus be provided to the particulate filter without the risk of uncontrolled soot burnoff due to a high level of excess oxygen.

Alternatively, it is advantageously provided to design the particulate filter with a three-way catalytically active coating as a four-way catalytic converter, and in the exhaust gas system to provide a first lambda sensor, in particular a broadband sensor, upstream from the three-way catalytic converter close to the engine, and to provide a second lambda sensor downstream from the electrically heatable three-way catalytic converter and upstream from the four-way catalytic converter. The catalytically active volume may be increased by means of a four-way catalytic converter, so that the three-way catalytic converter close to the engine and/or the electrically heatable three-way catalytic converter may have a smaller design, or the conversion power may be increased, in particular at high loads and high rotational speeds.

In another preferred embodiment of the invention, it is provided that the secondary air is provided by a secondary air system that includes a secondary air pump and a secondary air line that connects the secondary air pump to the introduction point, a secondary air valve being situated in the secondary air line. As the result of providing the secondary air via a secondary air pump, a secondary air stream may be provided independently of the operating situation of the internal combustion engine, compared to supplying secondary air by drawing in air from the air supply system downstream from a compressor of an exhaust gas turbocharger. In particular at low load or when idling, secondary air may be introduced, which, due to the low power of the compressor, would not be possible or would be possible only to an inadequate extent if air were supplied by drawing from the air supply system.

According to the invention, a method for regenerating a particulate filter or a four-way catalytic converter in the exhaust gas system of an internal combustion engine is proposed, wherein the internal combustion engine at its outlet is connected to an exhaust gas system in which a three-way catalytic converter close to the engine, an electrically heatable three-way catalytic converter downstream from the three-way catalytic converter close to the engine, and a particulate filter or a four-way catalytic converter downstream from the electrically heatable three-way catalytic converter are situated in the flow direction of an exhaust gas through the exhaust gas system, and having a secondary air system with which secondary air is introducible into an exhaust duct of the exhaust gas system downstream from the three-way catalytic converter close to the engine and upstream from the electrically heatable three-way catalytic converter, comprising the following steps:

activating the electrically heatable three-way catalytic converter when a regeneration of the particulate filter or of the four-way catalytic converter is requested, heating the electrically heatable three-way catalytic converter to its light-off temperature, adjusting the combustion air ratio of the internal combustion engine from a stoichiometric combustion air ratio to an understoichiometric combustion air ratio, and at the same time, blowing secondary air into the exhaust gas system downstream from the three-way catalytic converter close to the engine, resulting in an overstoichiometric exhaust gas-air ratio at the inlet of the particulate filter or the four-way catalytic converter.

The proposed method allows rapid, low-emission regeneration of the particulate filter or four-way catalytic converter, in particular a gasoline engine particulate filter in the underbody position of a motor vehicle, essentially independently of the load profile of the internal combustion engine or the driving profile of a motor vehicle with an internal combustion engine. The temperature necessary for regenerating the particulate filter or four-way catalytic converter is achieved with the aid of the electrically heatable three-way catalytic converter in combination with a rich adjustment of the engine and simultaneous blowing in of secondary air. The end of the regeneration is controlled via a loading model or a differential pressure measurement.

In one advantageous refinement of the method, it is provided that the regeneration of the particulate filter or of the four-way catalytic converter is ended when the pressure difference across the particulate filter or the four-way catalytic converter drops below a threshold value. If the difference across the particulate filter drops below a defined threshold value, complete regeneration of the particulate filter may be assumed. It may thus be easily checked whether adequate regeneration of the particulate filter or four-way catalytic converter has taken place.

In one preferred embodiment of the method, it is provided that the introduction of secondary air into the exhaust gas system starts with a time delay after the beginning of heating of the electrically heatable three-way catalytic converter. The electrically heatable three-way catalytic converter is initially brought to its light-off temperature by electrical heating before the internal combustion engine is adjusted from a stoichiometric combustion air ratio to an understoichiometric combustion air ratio, and at the same time, secondary air is blown into the exhaust gas system. In addition to the electrical heating of the electrically heatable three-way catalytic converter, chemical heating of the exhaust gas takes place due to the exothermic reaction of the unburned exhaust gas components with the oxygen from the secondary air system. Until the regeneration temperature of the particulate filter or the four-way catalytic converter is reached, the secondary air feed may also be selected in such a way that an exhaust gas-air ratio of lambda=1 results, so that despite an understoichiometric combustion air ratio of the internal combustion engine, the gaseous pollutants may be efficiently converted by the electrically heatable three-way catalytic converter through which stoichiometric exhaust gas flows. The gaseous pollutants in the heating phase are minimized in this way. Since excess oxygen must always be present for oxidizing the soot retained in the particulate filter or four-way catalytic converter, the complete conversion of the emissions during the regeneration of the particulate filter or four-way catalytic converter would not be ensured. To shorten or totally prevent this phase, it is possible to carry out the heating operation with an exhaust gas-air ratio of lambda=1, and during the regeneration of the particulate filter or four-way catalytic converter to once again operate the internal combustion engine with a stoichiometric combustion air ratio, so that the gaseous pollutants may be converted during the regeneration by the three-way catalytic converter close to the engine.

In one advantageous embodiment of the method, it is provided that the introduction of secondary air and the electrical heating of the electrically heatable three-way catalytic converter are ended simultaneously when the particulate filter or the four-way catalytic converter is completely regenerated. A switch may be made back to the normal operation of the internal combustion engine with a stoichiometric combustion air ratio, and the secondary air system may be switched off.

In another preferred embodiment of the method, it is provided that the internal combustion engine is operated with an understoichiometric combustion air ratio in a heating phase of the particulate filter or of the four-way catalytic converter, in this heating phase secondary air being blown in in such a way that stoichiometric exhaust gas results upstream from the particulate filter or the four-way catalytic converter, and the combustion air ratio and/or the secondary air blowing being adapted during the regeneration of the particulate filter or the four-way catalytic converter in such a way that overstoichiometric exhaust gas results in the exhaust duct upstream from the particulate filter or the four-way catalytic converter during the regeneration of the particulate filter or the four-way catalytic converter. An exothermic reaction of the unburned exhaust gas components with the secondary air blown into the exhaust duct may thus take place in the heating phase, thereby facilitating the heating of the particulate filter or four-way catalytic converter. At the same time, stoichiometric exhaust gas results which allows efficient exhaust aftertreatment of this exhaust gas by a three-way catalytic converter or a three-way catalytically active coating of an exhaust gas component, in particular by a four-way catalytic converter. The internal combustion engine may be operated with a stoichiometric combustion air ratio in the regeneration phase, so that the secondary air only provides the oxygen necessary for oxidizing the soot retained in the particulate filter or four-way catalytic converter. Efficient exhaust aftertreatment by the three-way catalytic converter close to the engine is thus possible. Alternatively, the internal combustion engine may continue to be operated with an understoichiometric combustion air ratio, the quantity of secondary air being increased in such a way that during the regeneration of the particulate filter or four-way catalytic converter, overstoichiometric exhaust gas results in the exhaust duct prior to entry into the particulate filter or the four-way catalytic converter. As a result of this operating state, the chemical heating of the particulate filter or four-way catalytic converter may also be maintained during the regeneration, thus avoiding the risk of cooling and termination of the regeneration due to the temperature being too low.

In one advantageous embodiment of the method, it is provided that the introduction of secondary air into the exhaust duct is not started until the particulate filter or the four-way catalytic converter has reached its regeneration temperature. The internal combustion engine may thus be operated longer with a stoichiometric combustion air ratio, and the gaseous pollutants are converted by the three-way catalytic converter close to the engine over the entire heating phase. However, since in this variant additional chemical heating of the electrically heatable three-way catalytic converter is dispensed with, more electrical heating power is required, and the heating of the electrically heatable three-way catalytic converter lasts longer under operating conditions that are otherwise unchanged.

In an alternative embodiment variant of the method, it is advantageously provided that the electrical heating of the electrically heatable three-way catalytic converter is ended when the electrically heatable three-way catalytic converter has reached its light-off temperature, and the introduction of secondary air is not started until after conclusion of the heating operation for the electrically heatable three-way catalytic converter. Over the entire method, stoichiometric exhaust gas may thus flow through at least one of the three-way catalytic converters, resulting in particularly efficient conversion of the gaseous exhaust gas components. However, it is disadvantageous that the particulate filter or four-way catalytic converter to be regenerated cools during the regeneration and may possibly have to be reheated.

In another embodiment variant of the method, it is provided that the regeneration of the particulate filter takes place intermittently, the electrically heatable three-way catalytic converter being electrically heated in each case when the temperature of the particulate filter or of the four-way catalytic converter has dropped below a threshold temperature. Intermittent regeneration of the particulate filter reduces the risk of uncontrolled soot burnoff on the particulate filter or four-way catalytic converter, and thus reduces the risk of thermal damage to the component in question.

In one advantageous refinement of this method, it is provided that the introduction of secondary air takes place continuously during the intermittent regeneration of the particulate filter or the four-way catalytic converter until the particulate filter or the four-way catalytic converter is completely regenerated. The quantity of secondary air is selected in such a way that stoichiometric exhaust gas results during understoichiometric operation of the internal combustion engine, and overstoichiometric exhaust gas results with a stoichiometric combustion air ratio. Additional heating phases may be initiated when the component temperature of the particulate filter or of the four-way catalytic converter drops below the regeneration temperature.

The embodiments of the invention mentioned in the present patent application, unless stated otherwise in the individual case, may advantageously be combined with one another.

BRIEF DESCRIPTION OF THE DRAWINGS

The invention is explained below in exemplary embodiments, with reference to the associated drawings, which show the following.

DETAILED DESCRIPTION OF THE INVENTION

Figure 1:
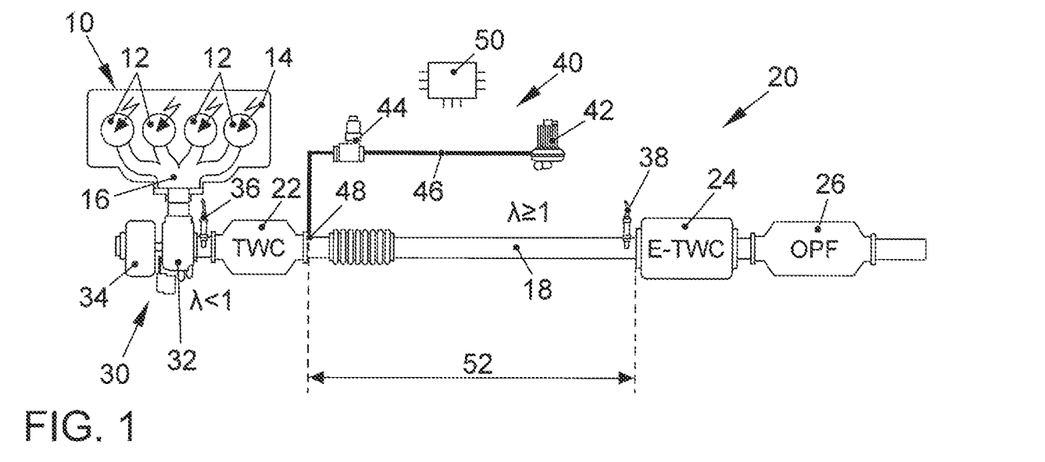
FIG. 1 shows a preferred exemplary embodiment of an internal combustion engine with an exhaust aftertreatment system according to the invention.
Figure 3:
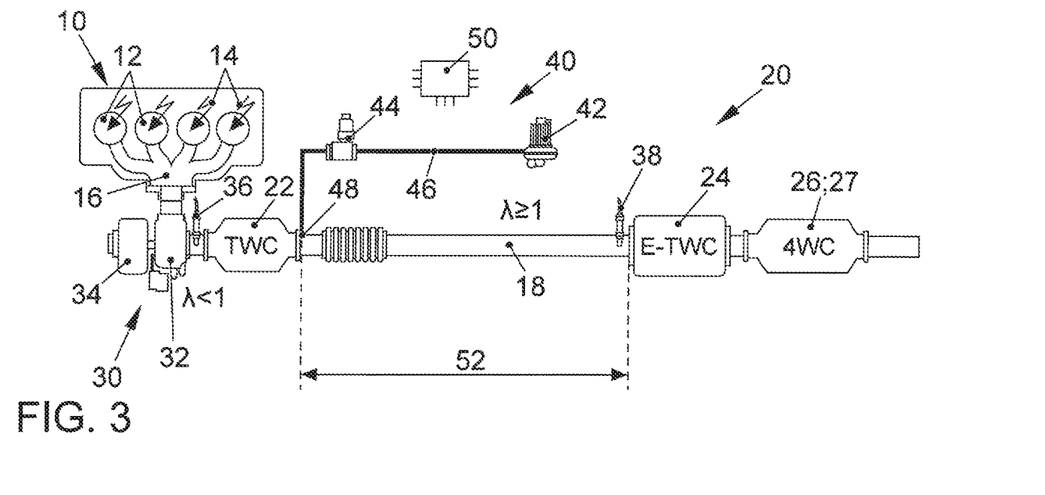
FIG. 3 shows another exemplary embodiment of an internal combustion engine with an exhaust aftertreatment system according to the invention, with the particulate filter designed as a four-way catalytic converter.

FIG. 1 shows an internal combustion engine 10 that is spark-ignited by means of spark plugs 14. The internal combustion engine has a plurality of combustion chambers 12. The internal combustion engine 10 at its outlet 16 is connected to an exhaust gas system 20. The exhaust gas system 20 includes an exhaust duct 18 in which a turbine 32 of an exhaust gas turbocharger 30, downstream from the turbine 32 a first three-way catalytic converter 22 close to the engine, and downstream from the first three-way catalytic converter 22 an electrically heatable three-way catalytic converter 24, are situated in the flow direction of an exhaust gas through the exhaust duct 18. A particulate filter 26 is situated downstream from the electrically heatable three-way catalytic converter 24. The particulate filter 26 preferably has a design that is free of a catalytic coating. Alternatively, the particulate filter 26 may be designed as a four-way catalytic converter 27 as illustrated in FIG. 3, i.e., a particulate filter 26 with a three-way catalytically active coating. In the exhaust duct 18, a first lambda sensor 36, preferably a broadband lambda sensor, is situated downstream from the outlet 16, and upstream from the first three-way catalytic converter 22, preferably downstream from the turbine 32 of the exhaust gas turbocharger 30 and upstream from the first three-way catalytic converter 22. In the exhaust duct 18, a second lambda sensor 38, in particular a further broadband sensor or a trim lambda sensor, is situated downstream from the first three-way catalytic converter 22 and upstream from the electrically heatable three-way catalytic converter 24. A first pressure sensor is provided in the exhaust duct 18, downstream from the electrically heatable three-way catalytic converter 24 and upstream from the particulate filter 26. A second pressure sensor is provided downstream from the particulate filter 26, so that a differential pressure measurement may take place across the particulate filter 26. In addition, at least one temperature sensor may be provided in the exhaust gas system 20 in order to determine an exhaust gas temperature and/or at least one component temperature of an exhaust aftertreatment component 22, 24, 26, in particular a temperature of the particulate filter 26. The exhaust aftertreatment system also includes a secondary air system 40 with a secondary air pump 42 and a secondary air line 46, which opens into the exhaust duct 18 of the exhaust gas system 20 at an introduction point 48 directly downstream from the three-way catalytic converter 22 close to the engine. This results in a preferably long mixing path 52 for the exhaust gas of the internal combustion engine 10 and the secondary air prior to entry into the electrically heatable three-way catalytic converter 24 and the particulate filter 26. A secondary air valve 44 with which the secondary air feed into the exhaust duct 18 may be controlled is provided in the secondary air line 46. The secondary air pump 42 and the secondary air valve 44 are controllable via an engine control unit 50 of the internal combustion engine 10. The combustion air ratio $\lambda_E$ of the internal combustion engine 10 in combination with the lambda sensors 36, 38 may be regulated via this control unit 50.

Figure 2:
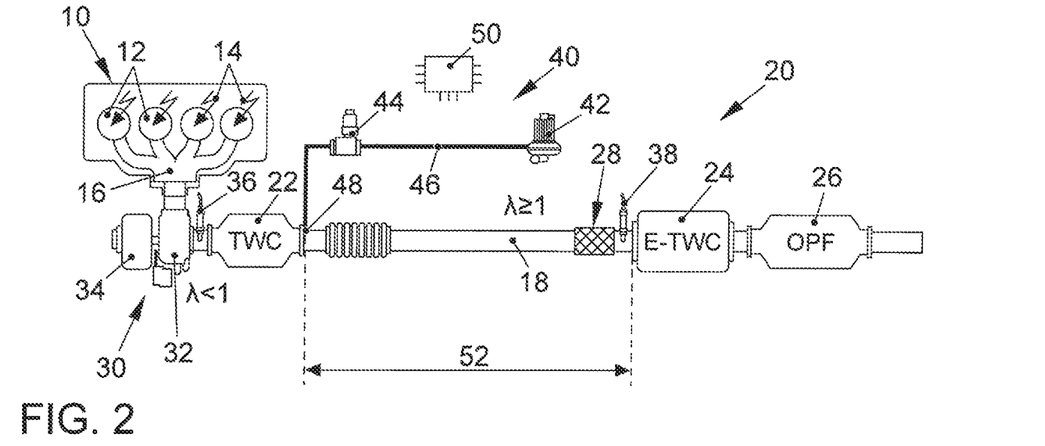
FIG. 2 shows another exemplary embodiment of an internal combustion engine with an exhaust aftertreatment system according to the invention, with provision of an additional hydrogen catalytic converter in the exhaust gas system.

FIG. 2 illustrates an alternative exemplary embodiment of an exhaust aftertreatment system according to the invention. With essentially the same design as in FIG. 1, a hydrogen catalytic converter 28 is connected upstream from the electrically heatable three-way catalytic converter 24; at the hydrogen catalytic converter, the hydrogen in the exhaust gas is oxidized to form water vapor to avoid distortion of the measuring signal at the second lambda sensor 38 by the hydrogen.

Figure 4:
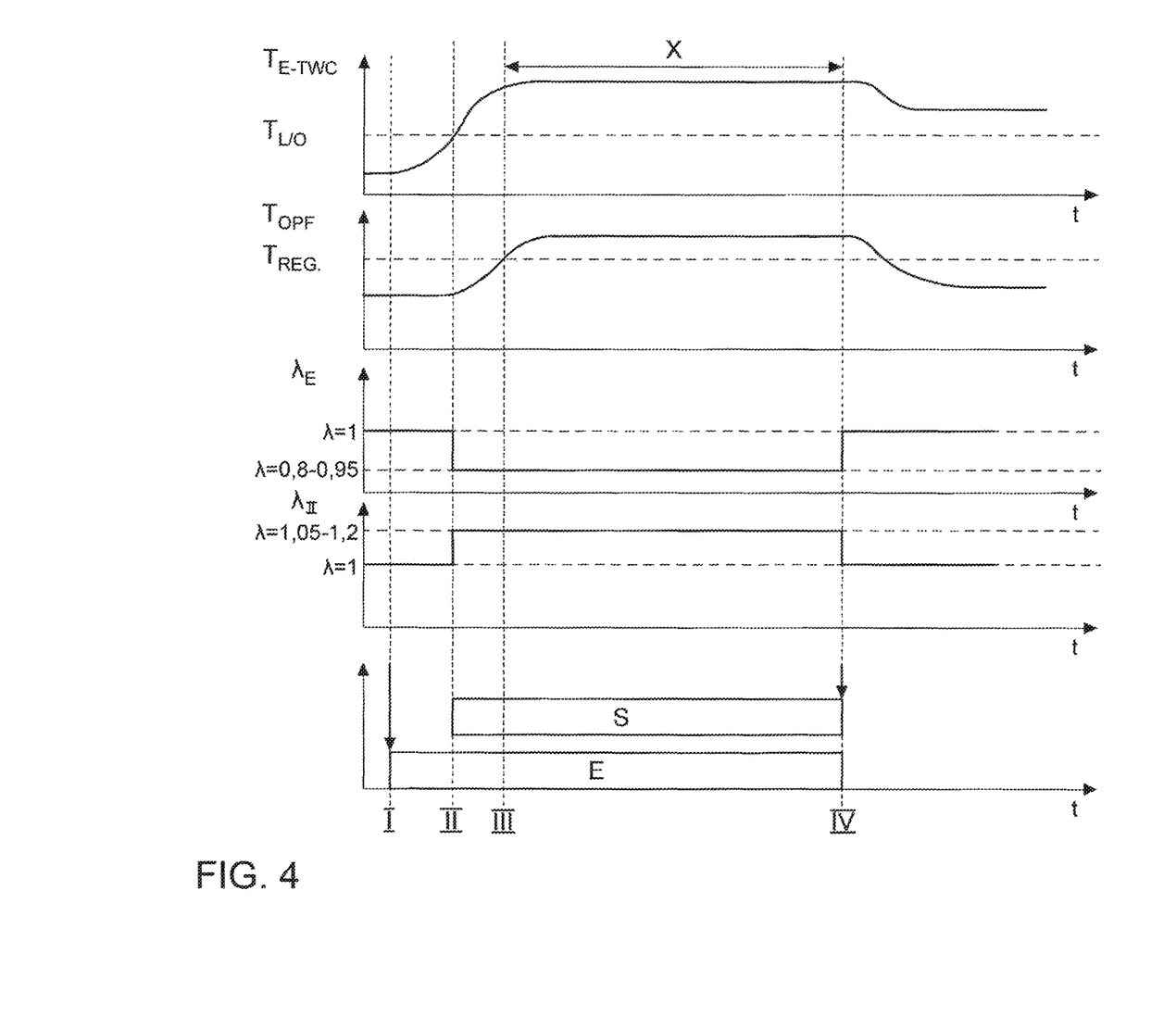
FIG. 4 shows a diagram for illustrating a method according to the invention for regenerating a particulate filter or four-way catalytic converter in the exhaust gas system of an internal combustion engine.

FIG. 4 illustrates a flow chart for a method according to the invention for regenerating a particulate filter 26 or a four-way catalytic converter 27. In the starting situation, the internal combustion engine 10 is operated with a stoichiometric combustion air ratio $\lambda_E=1$. The electrical heating E of the electrically heatable three-way catalytic converter 24 is started at start time I. This operating state is maintained until the electrically heatable three-way catalytic converter 24 has reached its light-off temperature $T_{LO}$. At time II the combustion air ratio of the internal combustion engine 10 is adjusted to an understoichiometric combustion air ratio $\lambda_E<1$, and at the same time the blowing in of secondary air S is activated. This results in overstoichiometric exhaust gas at the second lambda sensor 38 prior to entry into the electrically heatable three-way catalytic converter 24. Chemical heating takes place in parallel with the electrical heating of the electrically heatable three-way catalytic converter 24, since the unburned exhaust gas components are exothermically reacted with the secondary air at the electrically heatable three-way catalytic converter 24. This operating state is maintained until the particulate filter 26 or the four-way catalytic converter 27 is heated to its regeneration temperature $T_{REG}$. When the particulate filter 26 or the four-way catalytic converter 27 has reached its regeneration temperature $T_{REG}$, the retained soot is oxidized with the oxygen from the secondary air, and the particulate filter 26 or the four-way catalytic converter 27 is regenerated in this way. The regeneration is depicted by reference symbol X in the diagram. When the regeneration X of the particulate filter 26 or the four-way catalytic converter 27 is concluded, the electrical heating E and the secondary air feed S are switched off at time IV. The internal combustion engine 10 is concurrently switched from the understoichiometric operation back to a stoichiometric operation.

Figure 5:
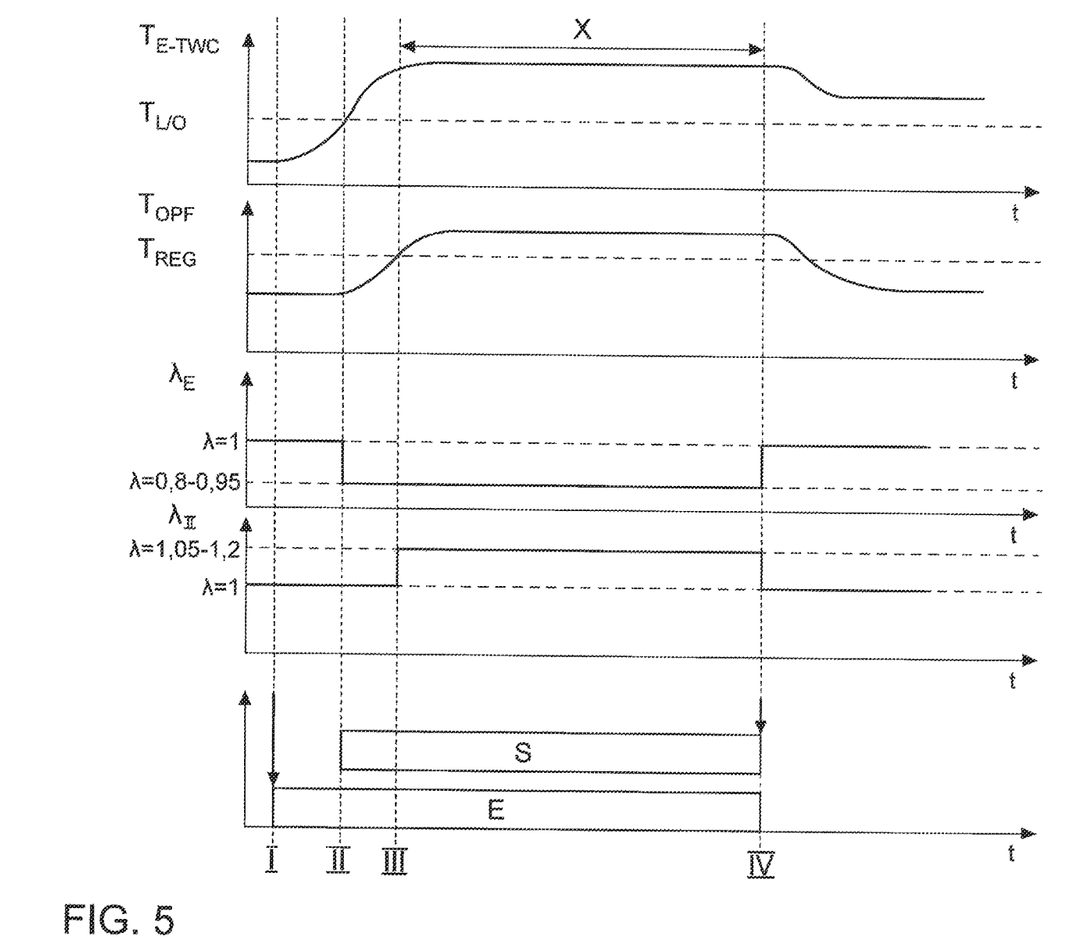
FIG. 5 shows a second diagram for illustrating an alternative method for regenerating a particulate filter.

FIG. 5 illustrates an alternative exemplary embodiment of a method according to the invention for regenerating the particulate filter 26 or the four-way catalytic converter 27. With essentially the same process as described for FIG. 4, in this exemplary embodiment the secondary air is initially controlled at time II in such a way that stoichiometric exhaust gas results, and not until time III is the secondary air increased in such a way that overstoichiometric exhaust gas results and the secondary air system 40 supplies the oxygen necessary for regenerating the retained soot. The gaseous emissions are thus minimized in the heating phase, since the electrically heatable three-way catalytic converter 24 is still acted on with a stoichiometric exhaust gas in the heating phase, and thus contributes to efficient conversion of the gaseous pollutants.

Figure 6:
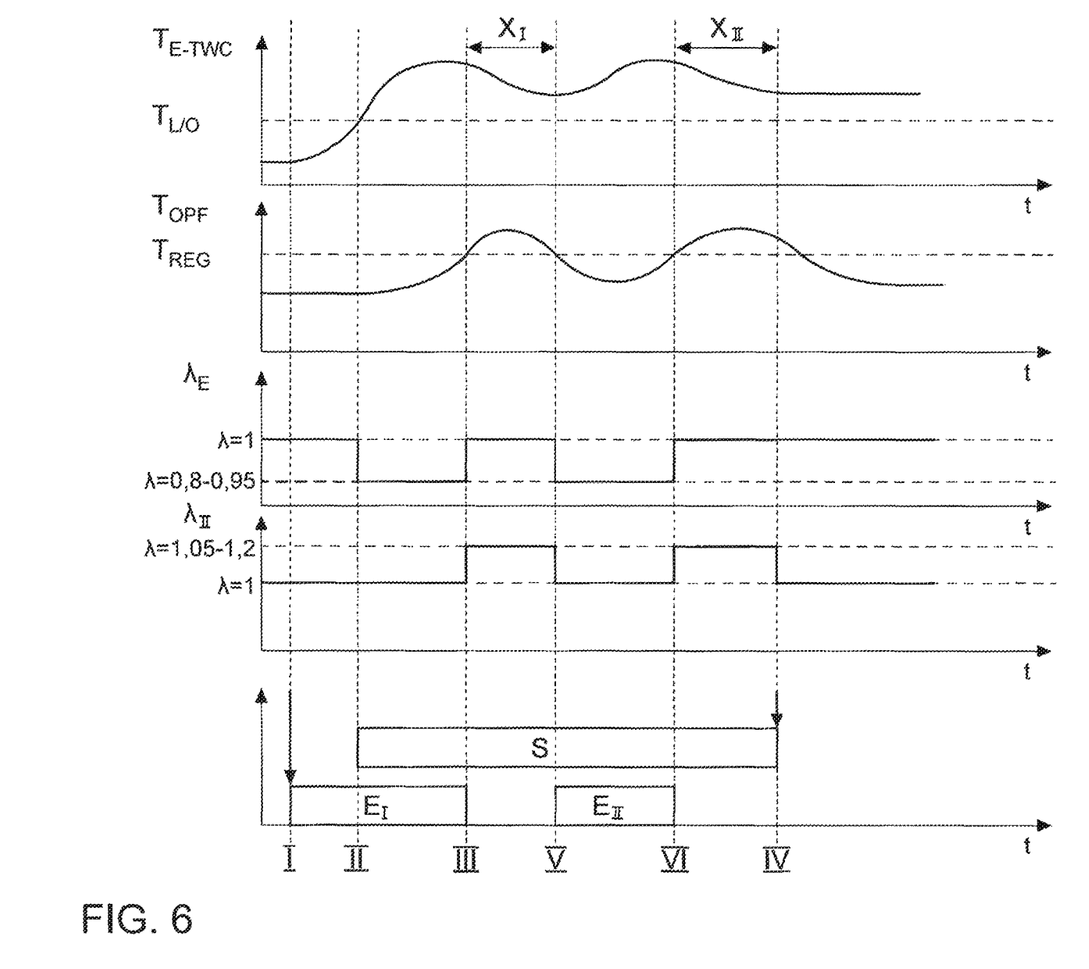
FIG. 6 shows a third diagram for illustrating an alternative method for regenerating a particulate filter.

FIG. 6 illustrates another method according to the invention for regenerating the particulate filter 26 or the four-way catalytic converter 27. With essentially the same process as described for FIGS. 4 and 5, the regeneration X of the particulate filter 26 or four-way catalytic converter 27 is divided here into two phases $X_I$ and $X_{II}$. Since excess oxygen must always be present for oxidizing soot, complete conversion of the emissions during the regeneration of the particulate filter 26 or four-way catalytic converter 27 would not be ensured. To shorten or prevent this phase, it is possible to carry out the heating operation with stoichiometric exhaust gas, and during the regeneration phases $X_I$, $X_{II}$ to operate the internal combustion engine 10 with a stoichiometric combustion air ratio $\lambda_E=1$. It is thus ensured in each phase of the method that a stoichiometric exhaust gas flows through at least one of the catalytic converters 22, 24. However, with this method the particulate filter 26 or four-way catalytic converter 27 cools during the regeneration, and an additional heating step must be initiated at time V. The electrical heating is maintained until the particulate filter 26 or four-way catalytic converter 27 has once again reached its regeneration temperature $T_{REG}$, so that the second regeneration phase $X_{II}$ follows at time VI. As soon as the particulate filter 26 or four-way catalytic converter 27 has once again reached the regeneration temperature $T_{REG}$, prior to entry into the particulate filter 26 or four-way catalytic converter 27 the exhaust gas-air ratio may once again be adjusted in such a way that a slightly overstoichiometric exhaust gas-air ratio of $1.05<\lambda_{EG}<1.2$ results in order to allow the oxidation of the soot. This intermittent regeneration operation is carried out until the particulate filter 26 or the four-way catalytic converter 27 is completely regenerated.

Figure 7:
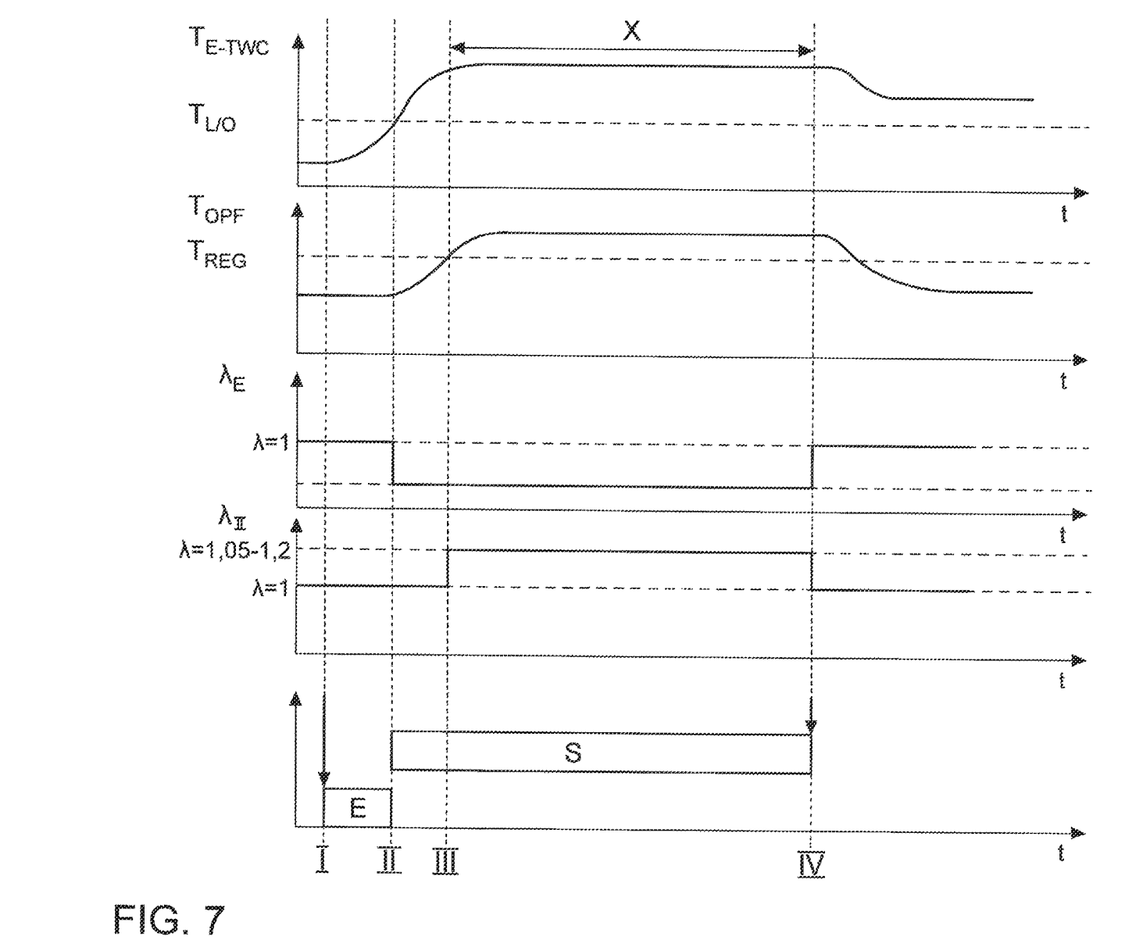
FIG. 7 shows a fourth diagram for illustrating an alternative method for regenerating a particulate filter.

FIG. 7 illustrates another method according to the invention for regenerating the particulate filter 26 or four-way catalytic converter 27. The electrically heatable three-way catalytic converter 24 is electrically heated only until this catalytic converter 24 has reached its light-off temperature $T_{LO}$. Starting at time II, the further heating of this catalytic converter 24 takes place via an exothermic chemical reaction of the unburned exhaust gas components with the oxygen from the secondary air. Electrical energy may be saved in this way.

Figure 8:
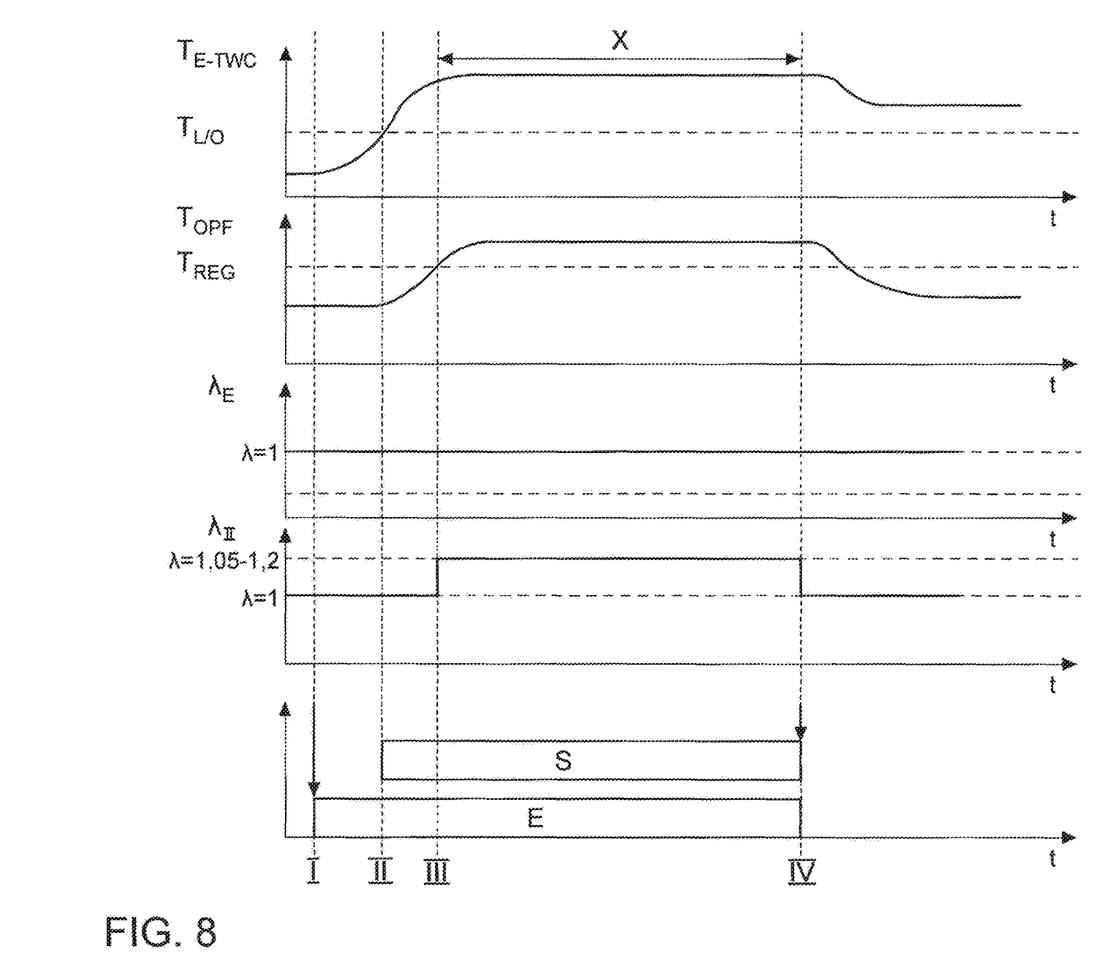
FIG. 8 shows another diagram for illustrating a method according to the invention for regenerating a particulate filter.

FIG. 8 illustrates another exemplary embodiment of a method according to the invention. In this embodiment variant, the internal combustion engine 10 is continuously operated with a stoichiometric combustion air ratio $\lambda_E=1$, and the necessary temperature increase of the particulate filter 26 or the four-way catalytic converter 27 is achieved solely by electrically heating the electrically heatable three-way catalytic converter 24. However, this method requires higher electrical heating power compared to the other described methods, which possibly may not be sufficient in all operating points to provide a regeneration of the particulate filter 26 or the four-way catalytic converter 27. However, this approach is characterized by the lowest emissions.

Figure 9:
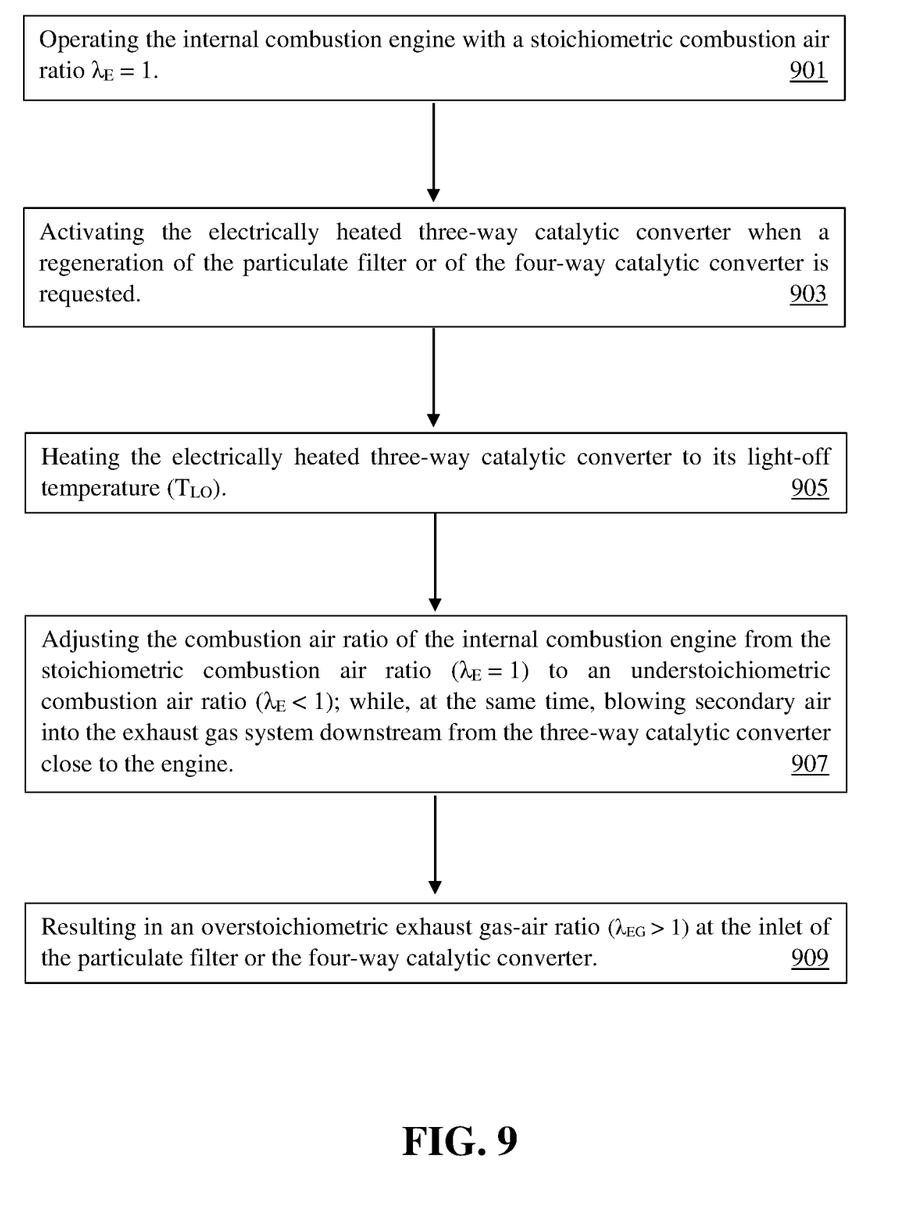
FIG. 9 shows a flowchart illustrating a method according to the invention for regenerating a particulate filter or a four-way catalytic converter.

FIG. 9 illustrates a flow chart for a method according to the invention for regenerating a particulate filter 26 or a four-way catalytic converter 27. In step 901, the internal combustion engine 10 is operated with a stoichiometric combustion air ratio $\lambda_E=1$. In step 903, the electrical heating E of the electrically heated three-way catalytic converter 24 is started. In step 905, the electrical heating E of the electrically heated three-way catalytic converter 24 is maintained until the electrically heated three-way catalytic converter 24 has reached its light-off temperature $T_{Lo}$. In step 907, the combustion air ratio of the internal combustion engine 10 is adjusted to an understoichiometric combustion air ratio $\lambda_E<1$, while, at the same time, activating the blowing of secondary air S by the secondary air pump 42 into the exhaust gas system 20 downstream from the three-way catalytic converter 22 close to the engine. This results 909 in overstoichiometric exhaust gas-air ratio ($\lambda_{EG}>1$) at the inlet of the particulate filter 26 or the four-way catalytic converter 27. A benefit of providing the secondary air S via the secondary air pump 42 is the secondary air stream may be provided independently of the operating situation of the internal combustion engine, as compared to supplying secondary air by drawing in air from the air supply system downstream from a compressor of an exhaust gas turbocharger. In particular at low load or when idling, secondary air may be introduced, which, due to the low power of the compressor, would not be possible or would be possible only to an inadequate extent if air were supplied by drawing from the air supply system.

LIST OF REFERENCE SYMBOLS 10 internal combustion engine
12 combustion chamber
14 spark plug
16 outlet
18 exhaust gas duct
20 exhaust gas system
22 three-way catalytic converter
24 electrically heatable three-way catalytic converter
26 particulate filter
27 four-way catalytic converter
28 hydrogen catalytic converter
30 exhaust gas turbocharger
32 turbine
34 compressor
36 first lambda sensor
38 second lambda sensor
40 secondary air system
42 secondary air pump
44 secondary air valve
46 secondary air line
48 introduction point
50 control unit
52 mixing path
E electrical heating of the electrically heatable three-way catalytic converter
S secondary air blowing
X regeneration of the particulate filter
T temperature
$T_{E-TWC}$ temperature at the electrically heatable three-way catalytic converter
$T_{LO}$ light-off temperature
$T_{OPF}$ temperature of the particulate filter
$T_{REG}$ regeneration temperature of the particulate filter
$\lambda_E$ combustion air ratio of the internal combustion engine
$\lambda_{II}$ exhaust gas-air ratio at the inlet of the electrically heatable three-way catalytic converter 10

The invention claimed is:

1. An exhaust aftertreatment system for an internal combustion engine having an exhaust gas system, comprising:
a three-way catalytic converter close to the engine,
a particulate filter or four-way catalytic converter situated downstream from the three-way catalytic converter close to the engine,
an electrically heated three-way catalytic converter situated downstream from the three-way catalytic converter and upstream from the particulate filter or the four-way catalytic converter,
a secondary air pump configured to provide secondary air via an introduction point into an exhaust duct of the exhaust gas system,
a hydrogen catalytic converter situated downstream from the introduction point and upstream from the electrically heated three-way catalytic converter,
a first lambda sensor situated upstream from the three-way catalytic converter close to the engine, and
a second lambda sensor situated downstream from the hydrogen catalytic converter and upstream from the electrically heated three-way catalytic converter,
wherein the secondary air pump is not a compressor of an exhaust gas turbocharger, and the introduction point is provided downstream from the three-way catalytic converter close to the engine, and upstream from the electrically heated three-way catalytic converter.

2. The exhaust aftertreatment system according to claim 1, wherein the particulate filter has a design that is free of a catalytically active coating.

3. The exhaust aftertreatment system according to claim 1, wherein the electrically heated three-way catalytic converter has a design that is free of an oxygen store.

4. The exhaust aftertreatment system according to claim 3,
wherein the particulate filter is designed with a three-way catalytically active coating as a four-way catalytic converter, and
wherein, in the exhaust gas system a first lambda sensor is situated upstream from the three-way catalytic converter close to the engine, and a second lambda sensor is situated downstream from the electrically heated three-way catalytic converter and upstream from the four-way catalytic converter.

5. The exhaust aftertreatment system according to claim 1, wherein a secondary air line connects the secondary air pump to the introduction point, and a secondary air valve is situated in the secondary air line.

6. A method for regenerating a particulate filter or a four-way catalytic converter in an exhaust gas system of an internal combustion engine, wherein the internal combustion engine at its outlet is connected to the exhaust gas system in which a three-way catalytic converter close to the engine, an electrically heated three-way catalytic converter downstream from the three-way catalytic converter close to the engine, and a particulate filter or a four-way catalytic converter downstream from the electrically heated three-way catalytic converter are situated in the flow direction of an exhaust gas through the exhaust gas system, and having a secondary air system with which secondary air is introducible into an exhaust duct of the exhaust gas system downstream from the three-way catalytic converter close to the engine and upstream from the electrically heated three-way catalytic converter, the exhaust gas system further comprising a hydrogen catalytic converter situated downstream from the introduction point and upstream from the electrically heated three-way catalytic converter, wherein a first lambda sensor is situated upstream from the three-way catalytic converter close to the engine, and a second lambda sensor is situated downstream from the hydrogen catalytic converter and upstream from the electrically heated three-way catalytic converter, the method comprising the following steps:
activating the electrically heated three-way catalytic converter when a regeneration of the particulate filter or of the four-way catalytic converter is requested,
heating the electrically heated three-way catalytic converter to its light-off temperature ($T_{LO}$), and at the same time:
    adjusting the combustion air ratio of the internal combustion engine from a stoichiometric combustion air ratio ($\lambda_E=1$) to an understoichiometric combustion air ratio ($\lambda_E<1$), and
    blowing secondary air, via a secondary air pump which is not a compressor of an exhaust gas turbocharger, into the exhaust gas system downstream from the three-way catalytic converter close to the engine,
    thereby resulting in an overstoichiometric exhaust gas-air ratio ($\lambda_{EG}>1$) at the inlet of the particulate filter or the four-way catalytic converter.

7. The method according to claim 6, wherein the regeneration of the particulate filter or four-way catalytic converter is ended when the pressure difference across the particulate filter or the four-way catalytic converter drops below a threshold value.

8. The method according to claim 6, wherein the introduction of secondary air into the exhaust gas system starts with a time delay after the beginning of heating of the electrically heated three-way catalytic converter.

9. The method according to claim 6, wherein the introduction of secondary air and the electrical heating of the electrically heated three-way catalytic converter are ended simultaneously when the particulate filter or the four-way catalytic converter is completely regenerated.

10. The method according to claim 6, wherein, in a heating phase of the particulate filter, the internal combustion engine is operated with an understoichiometric combustion air ratio ($\lambda<1$), in this heating phase secondary air being blown in in such a way that stoichiometric exhaust gas results upstream from the particulate filter or the four-way catalytic converter, and the combustion air ratio and/or the secondary air blowing being adapted during the regeneration of the particulate filter or the four-way catalytic converter in such a way that overstoichiometric exhaust gas results in the exhaust duct upstream from the particulate filter or the four-way catalytic converter during the regeneration of the particulate filter or the four-way catalytic converter.

11. The method according to claim 6, wherein the electrical heating of the electrically heated three-way catalytic converter is ended when the electrically heated three-way catalytic converter has reached its light-off temperature, and the introduction of secondary air is not started until after conclusion of the heating operation for the electrically heated three-way catalytic converter.

12. The method according to claim 6, wherein the regeneration of the particulate filter or of the four-way catalytic converter takes place intermittently, the electrically heated three-way catalytic converter being electrically heated in each case when the temperature of the particulate filter or of the four-way catalytic converter has dropped below a threshold temperature.

13. The method according to claim 12, wherein the introduction of secondary air takes place continuously during the intermittent regeneration of the particulate filter or the four-way catalytic converter until the particulate filter or the four-way catalytic converter is completely regenerated.

\* \* \* \* \*